INVENTOR.
Frederick J. Peterson
BY
Paul J. Ethington
ATTORNEY

United States Patent Office

3,167,965
Patented Feb. 2, 1965

3,167,965
ACCELEROMETER
Frederick J. Peterson, Detroit, Mich., assignor to General Motors Corporation, Detroit, Mich., a corporation of Delaware
Filed Dec. 19, 1962, Ser. No. 245,845
6 Claims. (Cl. 73—492)

This invention relates to means for permanently recording whether a body has been subjected to a pre-determined magnitude of acceleration force in a given direction.

It is frequently desirable in the transportation of fragile goods that some means be provided to inform the receiver of the maximum acceleration force which acted on the goods in a given direction during transit. Whereas complex electro-mechanical accelerometers and recording devices therefor are well known in the prior art they are oftentimes too expensive to justify their use for inspecting the handling of fragile goods during transit. Hence, it is desirable that some relatively non-complex inexpensive means be used.

In accordance with this invention, a relatively non-complex inexpensive means is provided for permanently recording whether a body has been subjected to a pre-determined magnitude of acceleration force in a given direction. The means includes a beam member mounted at one end to a body subjected to acceleration forces. The member is constructed of material exhibiting a yield strength which remains substantially constant whether it be subjected to slow or rapid loading. Accordingly, when the body is subjected to an acceleration force having a force component of pre-determined magnitude normally of the plane defined by the width and length of the beam member, when the member is in an unstressed condition, a bending moment will be produced acting to stress the member beyond its elastic limit so as to thereby deform the member with a permanent set.

A more complete understanding of this invention may be had from the detailed description which follows taken with the accompanying drawing in which.

Figure 1:
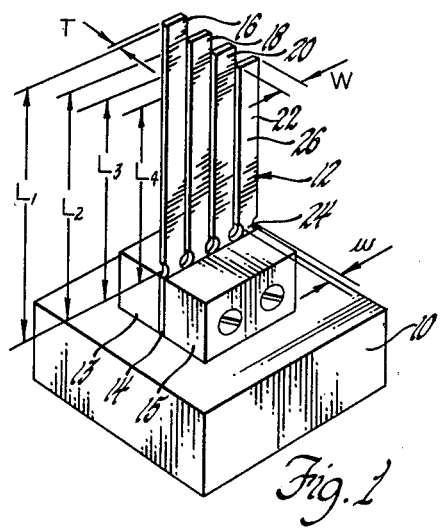
FIGURE 1 is a perspective view of one embodiment of the invention.
Figure 2:
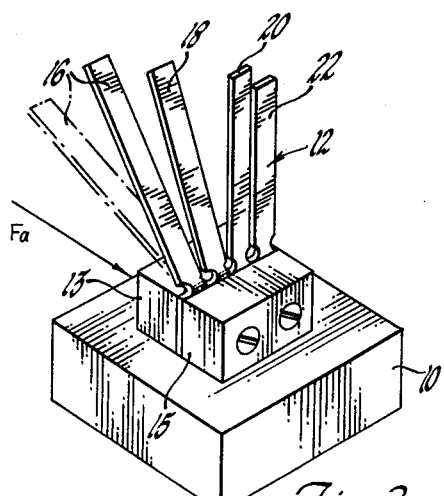
FIGURE 2 is a perspective view of the embodiment of the invention shown in FIGURE 1 with two of the beam members stressed beyond their elastic limits.

Referring now to the drawing and more particularly to FIGURES 1 and 2, there is shown one embodiment of the accelerometer mounted on a body 10 which is subjected to acceleration forces. The accelerometer comprises a flat sheet member 12 having a uniform thickness T. The sheet member 12 includes a base portion 14 suitably clamped between two blocks 13 and 15 mounted on the body 10. The base portion 14 has beam members 16, 18, 20 and 22 protruding therefrom in cantilever fashion and in their unstressed condition, as shown in FIGURE 1, their respective widths and lengths define coincident planes.

Each beam member includes a necked portion 24 and a working portion 26. The necked portion 24 of each beam member is located adjacent blocks 13 and 15 and is formed by drilling holes of equal diameter in the sheet member 12 midway between and at the base of adjacent beam members so that the narrowest part of the necked portions 24 are of equal width $w$. The working portions 26 of the beam members are of equal width $W$ throughout their respective lengths. The beam members 16, 18, 20 and 22 are respectively formed with succeedingly shorter lengths $L_1$, $L_2$, $L_3$ and $L_4$.

Figure 3:
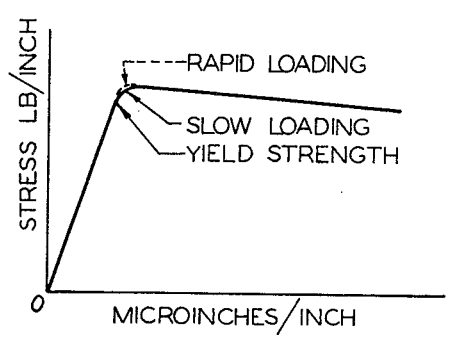
FIGURE 3 is a graphical representation of stress versus displacement illustrating the yield strength of the material used for the beam members in FIGURE 1.

The sheet member 12 is preferably constructed of annealed low carbon steel exhibiting yield strength (either compressive or tensile) which remains substantially constant whether it be subjected to slow or rapid loading. This characteristic is illustrated in FIGURE 3.

Upon subjecting the body 10 to acceleration forces including a force component $F_a$, as illustrated in FIGURE 2, normally of the plane defined by the lengths (L) and widths (W) of the beam members, when in their unstressed condition, a bending moment due to the inertia of the body will be produced acting to stress the members beyond their elastic limits to thereby deform them with a permanent set. The deformity will occur at the necked portion of each member since it defines an area of increased stress sensitivity.

The bending stresses, tensile and compressive, at the necked portion of any beam member may be defined by the following equation:

$$S = \frac{3dWL^2G}{wT} \qquad (1)$$

where $S$ = the maximum stress, either tensile or compressive, in pounds per square inch at which the beam member is stressed beyond its elastic limit so as to deform with a permanent set;
$d$ = the density of the material of the beam member in pounds per cubic inch;
$W$ = the width of the working portion 26 of the beam member in inches;
$w$ = the width of the narrowest part of the necked portion 24 of the beam members in inches;
$T$ = the thickness of the beam member in inches; and
$G$ = the number of the forces of gravity exerted by acceleration force $F_a$ normally of the beam where one "G" is 32.2 feet per second per second.

In accordance with this invention, the lengths of the beam members are chosen whereby the shortest member that is bent with a permanent set is indicative of the magnitude of the maximum force component which acted on the body normally of the plane defined by the members, when in their unstressed condition. Thus, with the beam members constructed of equal width (W) throughout their working portions 26 and of equal width ($w$) at the narrowest part of their necked portions 24 it is apparent, in view of Equation 1 that the ratio of the forces respectively required to stress any two beam members beyond their elastic limits so as to deform them with a permanent set is inversely equal to the ratio of the lengths squared of the two members. It is desirable that the sensitivity of each beam member, i.e. the value of $F_a$ in "G's" required to stress the member beyond its elastic limit so as to deform it with a permanent set, be predetermined, such as 20G for beam 16, 40G for beam 18, 60G for beam 20 and 80G for beam 22. Therefore, after assigning a different sensitivity to each beam member, the members are constructed so that the ratio of the lengths of any two members is inversely equal to the square root of the ratio of the magnitudes of the force components normally of the members required to respectively stress them beyond their elastic limits so as to deform them with a permanent set.

If the body 10 is now subjected to acceleration forces including a force component $F_a$ then upon inspecting the beam members and noting, for example, that beam members 16 and 18 are bent beyond their elastic limits with permanent sets at their necked portions 24, it is known that the acceleration force component $F_a$ was at least 40G, the sensitivity of member 18, but less than 60G, the sensitivity of member 20. Also, by noting the angular displacement of the beam members with respect to their unstressed positions, an indication is obtained as to the time duration of $F_a$. For example, a 20G force may cause beam member 16 to bend with a permanent set as shown by the solid line in FIGURE 2. However, if the time duration of the 20G force was relatively long, the member 16 would take position as shown by the broken lines.

Figure 4:
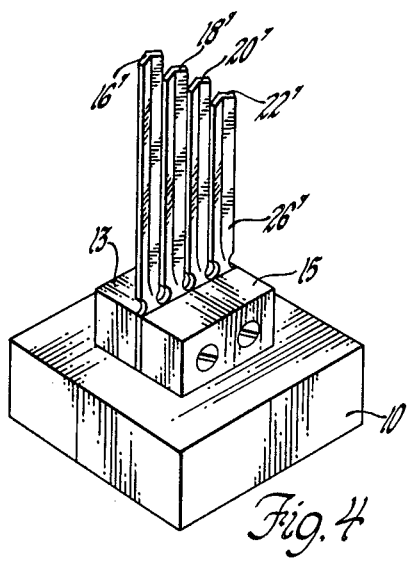
FIGURE 4 is a perspective view of a second embodiment of the invention.

In FIGURE 4, there is shown a second embodiment of the invention. This embodiment is substantially identical to that shown in FIGURE 1 but for the beam members 16′, 18′, 20′ and 22′, which are each crimped about the longitudinal axis of its working portion 26′. Crimping the beam members minimizes any tendency of the members to whip when the body 10 has been acted upon by acceleration forces. This increases the accelerometer's ability to indicate acceleration forces of short duration. Crimped beam members may also be desirable where space requirements dictate the need for minimum whip of the members. However, crimping may be unnecessary for a beam member having a large ratio of the width (W) of its working portion 26 to the width (w) of the narrowest part of its necked portion 24.

Figure 5:
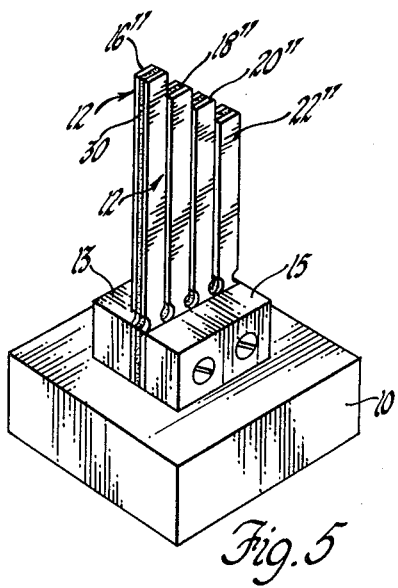
FIGURE 5 is a perspective view of a third embodiment of the invention.

In FIGURE 5, there is shown a third embodiment of the invention. This embodiment is also substantially the same as that shown in FIGURES 1 and 2. However, the beam members 16″, 18″, 20″ and 22″ are formed from a sandwich construction. Two sheet members 12 each identical to that shown in FIGURE 1 are provided having a vibration damping material 30 such as polyvinyl chloride sandwiched therebetween. The damping material 30 serves to damp out any tendency of the beam members to resonate, which might fatigue the members and reduce their yield strength. This might occur, for example, as the result of vibrations imparted to the beam members due to acceleration forces below that required to stress the members beyond their elastic limits. In addition, the use of damping material 30 will eliminate or reduce beam member overshoot to half wave sinusoidal acceleration force components which occur at frequencies equal to the natural frequency of the beam members.

Although the description of this invention has been given with respect to three particular embodiments, it is not to be construed in a limiting sense. Numerous variations and modifications within the spirit and scope of the invention will now occur to those skilled in the art. For a definition of the invention, reference is made to the appended claims.

I claim:

1. Means for permanently recording whether a body has been subjected to a predetermined magnitude of acceleration force in a given direction comprising a beam member mounted at one end to a body subjected to acceleration forces whereby when the body is subjected to an acceleration force having a force component of predetermined magnitude normally of the place defined by the width and length of the beam member such that when the member is in an unstressed condition a bending moment will be produced acting to stress the beam member beyond its elastic limit so as to thereby deform the member with a permanent set, said beam member being crimped along its length so as to provide a degree of stiffness to the member to minimize any tendency to whip when the body has been acted upon by acceleration forces.

2. Means for permanently recording whether a body has been subjected to a predetermined magnitude of acceleration force in a given direction comprising, a beam member mounted at one end to a body subjected to acceleration forces whereby when the body is subjected to an acceleration force having a force component of predetermined magnitude normally of the plane defined by the width and length of the beam member such that when the member is in an unstressed condition a bending moment will be produced acting to stress the beam member beyond its elastic limit so as to thereby deform the member with a permanent set, said beam member being of a sandwich construction including first and second members having a vibration damping material therebetween for minimizing any tendency of the beam member to resonate.

3. Means for permanently recording the magnitude of the maximum acceleration force and the time duration of the force to which a body has been subjected in a given direction comprising, a plurality of beam members each being mounted at one end to a body subjected to acceleration forces, the beam members being each constructed of the same material which exhibits a yield strength that remains substantially constant whether the members be subjected to slow or rapid loading, each beam member having a necked portion of reduced width along a portion of its length near its supported end and a working portion of uniform width throughout the remainder of its length, the beam members being each of equal thickness throughout their lengths, the width of the narrowest part of the necked portion and the width of the working portion of each beam member being respectively equal to the width of the narrowest part of the necked portion and the width of the working portion of each of the other beam members, the beam members being each of a different length and that the ratio of the length of any two beam members being inversely equal to the square root of the ratio of the magnitudes of the force components normally of the beam members required to respectively stress the two members beyond their elastic limits so as to deform with a permanent set, and the respective lengths and widths of the beam members defining parallel planes when the beam members are in an unstressed condition whereby when the body is acted upon by acceleration forces having force components normally of the parallel planes bending moments will be produced acting to stress the members beyond their elastic limits so that the shortest member that is stressed beyond its elastic limit so as to deform at its necked portion with a permanent set will be indicative of the magnitude of the maximum force component which acted on the body normally of the parallel planes and that the magnitude of the angle to which each member has been bent with a permanent set with respect to the parallel planes is indicative of the time duration of the acceleration forces, each said beam member being crimped along the length of its working portion so as to provide a degree of stiffness to the member to minimize any tendency to whip when the body has been acted upon by acceleration forces.

4. Means for permanently recording the magnitude of the maximum acceleration force and the time duration of the force to which a body has been subjected in a given direction comprising, a plurality of beam members each being mounted at one end to a body subjected to acceleration forces, the beam members being each constructed of the same material which exhibits a yield strength that remains substantially constant whether the members be subjected to slow or rapid loading, each beam member having a necked portion of reduced width along a portion of its length near its supported end and a working portion of uniform width throughout the remainder of its length, the beam members being each of equal thickness throughout their lengths, the width of the narrowest part of the necked portion and the width of the working portion of each beam member being respectively equal to the width of the narrowest part of the necked portion and the width of the working portion of each of the other beam members, the beam members being each of a different length and that the ratio of the lengths of any two beam members being inversely equal to the square root of the ratio of the magnitudes of the force components normally of the beam members required to respectively stress the two members beyond their elastic limits so as to deform with a permanent set, and the respective lengths and widths of the beam members defining parallel planes when the beam members are in an unstressed condition whereby when the body is acted upon by acceleration forces having force components normally of the parallel planes bending moments will be produced acting to stress the members beyond their elastic limits so that the shortest member that is stressed beyond its elastic limit so as to deform at its necked portion with a permanent set will be indicative of the magnitude of the maximum force component which acted on the body normally of the parallel planes and that the magnitude of the angle to which each member has been bent with a permanent set with respect to the parallel planes is indicative of the time duration of the acceleration forces, each said beam member being of a sandwich construction including first and second members having polyvinyl chloride therebetween for damping out any tendency of the beam member to resonate.

5. A device for permanently recording the magnitude of the maximum acceleration force to which a body has been subjected in a given direction comprising a set of graduated beam members each mounted at one end to said body so as to be subjected to said acceleration forces, each of said beam members having a necked portion of reduced width at the portion of its length nearest its supported end and a working portion of substantially uniform width throughout the remainder of its length, the relationship between the length of each said beam member and the cross-section of the necked portion thereof varying such that each beam member yields at a different predetermined value of acceleration, each said beam member being crimped along its length so as to provide a degree of stiffness to the member to minimize any tendency to whip when the body has been acted upon by acceleration forces.

6. A device for permanently recording the magnitude of the maximum acceleration force to which a body has been subjected in a given direction comprising a set of graduated beam members each mounted at one end to said body so as to be subjected to said acceleration forces, each of said beam members having a necked portion of reduced width at the portion of its length nearest its supported end and a working portion of substantially uniform width throughout the remainder of its length, the relationship between the length of each of said beam member and the cross-section of the necked portion thereof varying such that each beam member yields at a different predetermined value of acceleration, each said beam member being comprised of a sandwich construction including first and second members having a vibration damping material therebetween for minimizing any tendency of the beam member to resonate.

References Cited in the file of this patent

UNITED STATES PATENTS

| 2,190,866 | Duby | Feb. 20, 1940 |
| 2,666,409 | Kane | Jan. 19, 1954 |
| 3,081,637 | Gevas | Mar. 19, 1963 |

FOREIGN PATENTS

| 748,408 | Germany | Nov. 2, 1944 |
| 652,077 | Great Britain | Apr. 18, 1951 |